US006757345B1

(12) United States Patent
Heinilä

(10) Patent No.: US 6,757,345 B1
(45) Date of Patent: Jun. 29, 2004

(54) RECEPTION METHOD AND RECEIVER

(75) Inventor: Marko Heinilä, Vantaa (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/623,041

(22) PCT Filed: Dec. 28, 1999

(86) PCT No.: PCT/FI99/01084

§ 371 (c)(1),
(2), (4) Date: Aug. 25, 2000

(87) PCT Pub. No.: WO00/41327

PCT Pub. Date: Jul. 13, 2000

(30) Foreign Application Priority Data

Dec. 31, 1998 (FI) ................................................. 982856

(51) Int. Cl.[7] ............................................... H04B 1/10
(52) U.S. Cl. ...................... 375/349; 375/343; 375/341; 375/148; 375/150
(58) Field of Search ................................. 375/142, 144, 375/148, 150, 349, 341, 347, 346, 267, 343; 455/137, 132, 133, 134, 139

(56) References Cited

U.S. PATENT DOCUMENTS

| | | | |
|---|---|---|---|
| 5,627,856 A | | 5/1997 | Durrant et al. |
| 5,757,853 A | | 5/1998 | Tsujimoto |
| 5,822,364 A | * | 10/1998 | Yamada et al. ............. 375/147 |
| 5,889,815 A | * | 3/1999 | Iwakiri ........................ 375/148 |
| 5,917,851 A | * | 6/1999 | Jarvela et al. .............. 375/148 |
| 6,178,193 B1 | * | 1/2001 | Kondo ........................ 375/130 |
| 6,188,679 B1 | * | 2/2001 | Sato ............................ 370/335 |
| 6,272,167 B1 | * | 8/2001 | Ono ............................ 375/144 |
| 6,373,882 B1 | * | 4/2002 | Atarius et al. .............. 375/148 |
| 6,611,548 B2 | * | 8/2003 | Lomp ......................... 375/148 |

FOREIGN PATENT DOCUMENTS

| | | |
|---|---|---|
| EP | 0 690 588 | 1/1996 |
| EP | 0 756 391 | 1/1997 |
| EP | 0 790 711 | 8/1997 |
| EP | 0 851 600 | 7/1998 |
| WO | WO 94/28640 | 12/1994 |
| WO | WO 96/10873 | 4/1996 |

OTHER PUBLICATIONS

Kishi, et al., "Application of the Short Time DFT Correlator to the RAKE receiver for DS/SS Communication System and its BER Improvement Effect," vol. 1, 1995, pp. 208–212, abstract, section 1. (The Sixth IEEE International Symposium on Personal, Indoor, and Mobile Radio Communications, 1995).

Furió, et al., "I–QTCM QPSK Synchronous DS/CDMA over Frequency–Selective Multipath Rayleigh Fading Channels with Selection Diversity," abstract (The Eighth IEEE Sympsoium on Waves of the Year 2000. PIMRC '97, vol. 1, 1007, pp. 216–220).

* cited by examiner

Primary Examiner—Phoung Phu
(74) Attorney, Agent, or Firm—Pillsbury Winthrop LLP

(57) ABSTRACT

The invention relates to a reception method and a receiver to receive signals supplied from a radio path, and the signals include information and each signal which arrives at the receiver is delayed by a unique delay value. The receiver includes a filtering device and a distribution device to determine the strength of a part of a signal delayed by a certain propagation delay by several values of the propagation delay. The distribution device compares the delay differences of the received signals with each other and forms sums of the strengths of the signal parts determined by different values of the propagation delay. The distribution device selects values deviate at least by a predetermined delay difference whose sum of the strengths of the signal parts obtains the highest possible value. The receiver indicates the received information by using the signals selected above.

23 Claims, 7 Drawing Sheets

RECEPTION METHOD AND RECEIVER

This application is the national phase of international application PCT/FI99/01084 filed Dec. 28, 1999 which designated the U.S.

FIELD OF THE INVENTION

The invention relates to a reception method wherein signals supplied from a radio path are received, and each signal which arrives at a receiver is delayed by a unique delay value.

BACKGROUND OF THE INVENTION

It is typical of a radio system that a signal travelling between a user and a base station does not travel straight but, depending on characteristics of the environment, propagates along a plurality of paths of different lengths from a transmitter to a receiver. Multipath propagation is mainly caused by the fact that a radio signal is reflected and scatters from obstacles on the propagation path of the signal. If signals travelling along different paths have a propagation delay of different length, it is possible for the signals to arrive at a receiver with different phases.

As a receiver solution a radio system can use a so-called RAKE receiver, which comprises one or more RAKE fingers. Each finger is an independent receiver which serves to compose and demodulate received signal components. The value of the propagation delay of a signal received by a finger can be selected such that the value corresponds to a delay caused to the radio signal by a certain propagation path. Typically, the signal components of different receiver fingers are combined, whereby a high-quality signal can be generated.

Radio systems use the CDMA method, for example, wherein a narrowband data signal is modulated by a spreading code which is more broadband than the data signal, whereby the data signal is spread over a relatively broad band. The spreading code usually comprises a long pseudorandom bit sequence. Each user of a subscriber terminal has a unique spreading code during a connection. In the CDMA system, a plurality of users can simultaneously transmit a signal over the same frequency band. The signals to be transmitted are separated from each other at the receiver on the basis of the pseudorandom spreading code. In the CDMA system, the propagation delay of the signal can be indicated as a delay of the spreading code wave form, for example.

In RAKE receivers, so-called maximal ratio combining is typically used in combining signals received from different fingers. A RAKE receiver can be applied to base stations and subscriber terminals. The subscriber terminals can be mobile telephones, for example. The RAKE receiver can be used, for example, in such a manner that it combines signals supplied from different base stations and different antenna sectors. This means that the RAKE receiver is suitable for use in soft handover and in softer handover when a transition is carried out from an antenna sector of a base station to another.

In order for a signal generated by the RAKE receiver to be of good quality, the correlators of the RAKE fingers should be optimally adjusted. A correlator of the RAKE finger is optimally adjusted when the delay of the spreading code wave form formed by the correlator corresponds as closely as possible to the propagation delay of the signal propagated on the radio path.

The propagation delay of the signal can be determined from impulse response formed from the signal received from the radio channel. The channel impulse response reveals the distribution of the total received signal power among different propagation delays. Different delay components can be calculated from the correlation between the received signal and the spreading code wave form, the correlation being determined for delays of the spreading code wave form of different lengths. The correlations can be determined for the spreading code by means of a matched filter. The matched filter enables even a large number of delay values to be determined efficiently.

A procedure of adjusting the delays of the spreading codes of the correlators of RAKE fingers to correspond to estimated values of the propagation delay of a radio wave is called RAKE finger allocation. In the prior art, RAKE fingers are allocated by setting the delays of the spreading code wave forms of the correlators to correspond to maximum power points occurring in measured impulse response.

The problem with the prior art is that finger allocation does not function efficiently in all situations. Particularly problematic are situations wherein a wide maximum power range occurs in the impulse response and the maximum power range comprises several signal components having roughly similar delays. As a result of the above-mentioned problem, part of the signal has been lost. Further problems have occurred because, for example, the tracing of the spreading code of the signal of the receiver finger has proceeded too close to the tracing of the spreading code of the neighbouring finger. It is impossible to achieve optimal finger allocation with the prior art solution since the correlator of each finger is optimized separately.

In the known solution, the code phases of the RAKE fingers are selected to correspond to the power maximums of the impulse response. Usually, the prior art solutions also use so-called code tracking to adjust the delay of the RAKE finger in an attempt to set the code phase more accurately at the maximum in the power density of the channel. Selecting the maximums and code tracking cause problems if the impulse response of the channel does not comprise maximum points clearly located separately. If code tracking moves the RAKE fingers near each other, the performance deteriorates since the fingers receive signal components propagated along the same multipaths. In such a case, the proportion of some multipaths in a maximal-ratio-combined signal becomes overemphasized and the quality of the combined signal deteriorates. The selection of the maximums may also cause part of the signal associated with the wide power maximum to be lost.

BRIEF DESCRIPTION OF THE INVENTION

An object of the invention is thus to provide a reception method and a receiver so as to enable the above-mentioned problems to be solved. This is achieved by the reception method disclosed in the introduction, which is characterized by determining the strength of a part of a signal delayed by a certain propagation delay for several values of the propagation delay, forming sums of the strengths of the signal parts determined for different propagation values, selecting from among the received signals those signals whose delay values deviate at least by a predetermined delay difference and whose sum of the strengths of the signal parts obtains the highest possible value, indicating information by using the signal parts which correspond to the selected delay values.

This is also achieved by the reception method disclosed in the introduction, which is characterized by determining the strength of a part of a signal delayed by a certain propagation delay for several values of the propagation delay, utilising in the method a trellis diagram comprising transitions weighted by coefficients dependent on the strengths of the parts of the signal, searching for optimal routes through the trellis diagram on the basis of the sums of the weight values of the transitions, selecting a number of delay values by utilising the found optimal routes, indicating the signals received from the radio path on the basis of the parts of the signals corresponding to the selected delay values.

The invention further relates to a receiver to receive signals supplied from a radio path, the signals comprising information and each signal arriving at the receiver delayed by a unique delay value.

The receiver of the invention is characterized in that the receiver comprises a device and a distribution device to determine the strength of a part of a signal delayed by a certain propagation delay by several values of the propagation delay, the distribution device compares the delay differences of the received signals with each other and forms sums of the strengths of the signal parts determined by different values of the propagation delay, the distribution device selects from among the received signals those signals whose delay values deviate at least by a predetermined delay difference and whose sum of the strengths of the signal parts obtains the highest possible value, and the receiver indicates the received information by using the signals selected above.

Preferred embodiments of the invention are disclosed in the dependent claims.

The invention is based on the idea that optimal delays (spreading code phases) are found for the fingers of a RAKE receiver by estimating the impulse response of the channel, which is formed from the power density of the signal at feasible values of propagation delays. Furthermore, the invention is based on the idea that the optimal delay values are found on the basis of the impulse response of a measured channel by using a specific optimization algorithm. Using the optimization algorithm guarantees that the code phases selected for the RAKE fingers sufficiently deviate from each other, i.e. the fingers are at least a so-called minimum distance away from each other.

In the method of the invention, the selection of suitable code phases is based on the fact that the selected code phases meet certain optimality conditions characteristic of the invention. The conditions are set so as to enable a signal of as high quality as possible to be achieved, the signal being formed by combining signals supplied from different RAKE fingers. A trellis diagram, i.e. a network diagram, is utilised in finding the code phases which meet the optimality conditions. An optimal route determined through the trellis diagram is utilised in searching for the code phases. The weight values of the transitions in the trellis diagram are selected by utilising the impulse response measured for the radio channel.

The method and receiver of the invention provide several advantages over the known methods and receiver solutions. The problems with the selection of the maximums and code tracking are avoided by the method of the invention since the delays are selected such that the receiver catches the most part of the signal regardless of the details of the impulse response form.

The reception method can be used although the impulse response of the channel comprises only one power maximum. In a case that commonly occurs in practice, the power maximum of the impulse response comprises several multipath-propagated signal components located near each other, the existence of the signal components being indicated by the broadening of the power maximum. In the method of the invention, the power maximum is optimally distributed among several fingers if the width of the maximum is sufficient. Thus, the reception achieves sensitivity greater than that in the known solutions.

In the method of the invention, the reception of a wide impulse response peak can easily be distributed among several fingers since the minimum distance condition characteristic of the invention used in the selection of the delays of the fingers guarantees that different fingers receive signal components propagating along separate multipaths. The method of the invention enables optimal finger positions to be found. Furthermore, the optimal number of fingers of the receiver can be determined by the method.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 1:
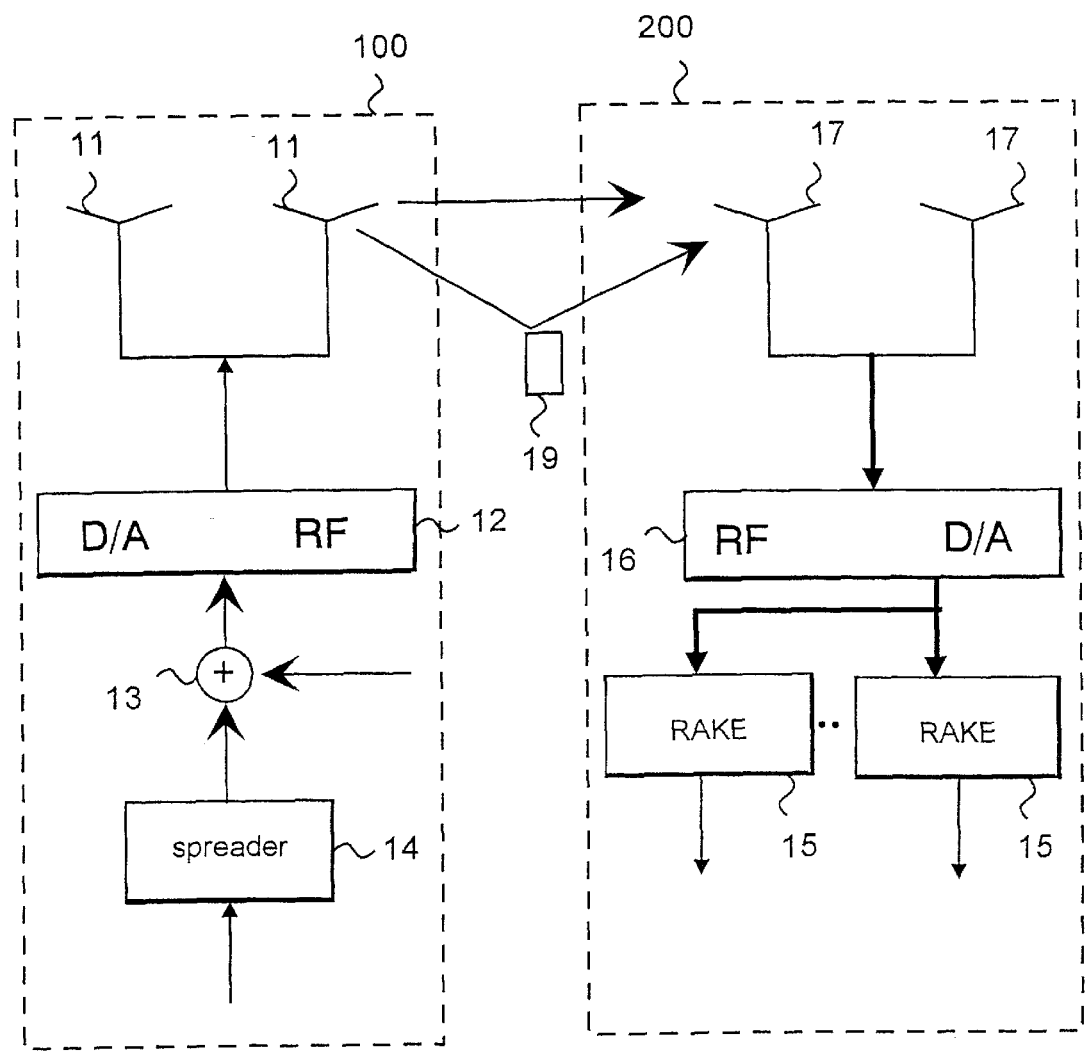
FIG. 1 shows a schematic view of a radio system wherein a method of the invention is used.

FIG. 1 shows a schematic view of a radio system comprising a transmitter 100 and a receiver 200. The radio system uses a reception method of the invention. The transmitter in the radio system in accordance with FIG. 1 is, for example, a base station or a subscriber terminal. The subscriber terminal can be, for example, a mobile telephone. The receiver shown in the figure is, for example, a base-station or a subscriber terminal. The radio system shown can be based, for example, on CDMA technique. The reception method of the invention wherein estimation is performed of the propagation delay of a radio signal to be transmitted between the transmitter and the receiver is not, however, restricted to be only used in the CDMA radio systems but the method is also suitable for use in TDMA-based radio systems, such as GSM systems, for example.

The figure shows that between the transmitter 100 and the receiver 200 there is an obstacle 19 in the way of the signal to be transmitted, causing the signal to be reflected. Part of the signal to be transmitted does, however, propagate to the receiver in a relatively direct manner. Reflections, for example, cause the signal components to arrive at the receiver 200 nonsimultaneously. A so-called multipath channel is created between the transmitter and the receiver in the radio system according to the figure.

The transmitter 100 comprises a signal spreader 14, a summing device 13, a device 12 and transmission antennas 11. The receiver 200 comprises reception antennas 17, a device 16 and a number of RAKE receivers 15. The signal spreader 14 receives a narrowband signal comprising bits which are spread into a broadband signal at the spreader. The bits received by the spreader 14 are channel-coded. The signal is spread by, for example, multiplying the bits to be transmitted by a spreading code, which results in a broadband signal.

The output signal of the spreader 14 is supplied to the summing device 13, which adds the signal supplied from the spreader 14 to the output signals of other spreaders possibly located at the same transmitter. From the summing device 13, the broadband sum signal is supplied to the device 12, which converts the received digital signal into an analogue baseband signal. Additionally, the device 12 converts the baseband signal further into an RF signal, which is transmitted to the radio path by the transmission antennas.

The reception antennas 17 at the receiver 200 receive the RF signals transmitted by the transmitter 100. The received signals are supplied to the device 16, which converts the RF signals received from the antennas into analogue baseband signals. The baseband signals are converted into a digital form at the device 16. The signals received from the device 16 are supplied to one or more RAKE receivers 15.

Figure 2:
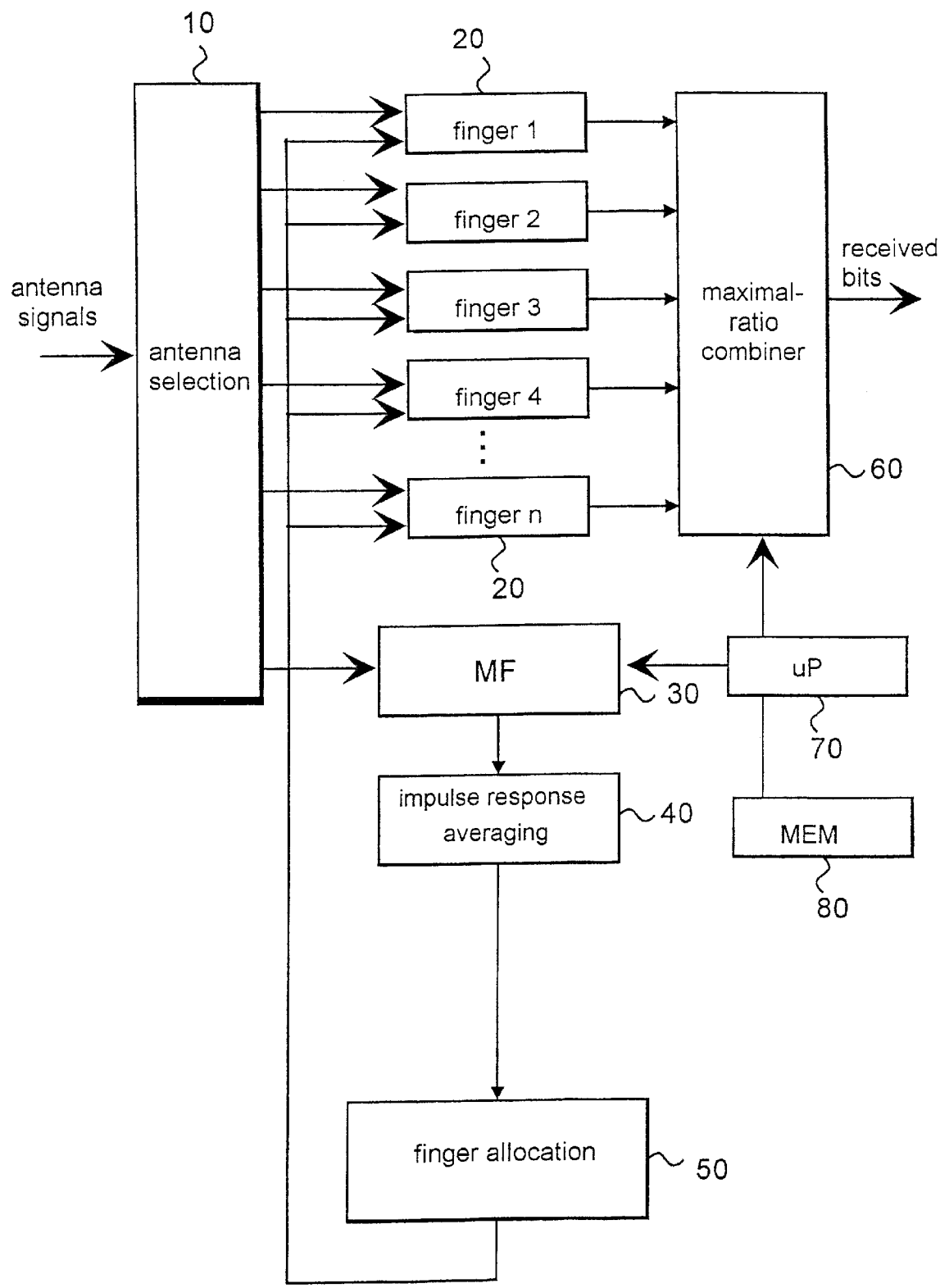
FIG. 2 shows a receiver.

FIG. 2 shows the structure of the receiver 200 of the invention. The receiver of the invention is preferably a RAKE receiver comprising a selector 10, a number of RAKE fingers 20 and a combiner 60. The selector selects signals to be supplied to each RAKE finger. The fingers decode the spreading code added to the signal at the transmitter. The receiver of the invention can be located at a subscriber terminal or a base station, for example. Although the structure of the receiver is described from the point of view of a RAKE receiver, the receiver is not entirely restricted to the RAKE receiver but the receiver can be of a different type as well.

The receiver further comprises a device 30 connected to the selector 10. The device 30 receives a signal from the selector. The device 30 is, in practice, a filter arranged in the spreading code used for measuring the impulse response of the channel. The receiver further comprises a device 40 and a finger distributor 50. The device 40 receives a signal from the device 30. The device 40 generates impulse responses for the received signals, which impulse responses enable the propagation delay profile of the channel to be determined, the propagation delay profile comprising the estimated power density of the impulse response of the channel. The power density is estimated by different values of the propagation delay. The device 40 can, for example, average out the impulse response values.

Information about the propagation delay profile is supplied to the distribution device 50, which selects the spreading code phases for the fingers. The distribution device 50 thus determines the spreading code phases by using the signal strengths measured for different delays by the devices 30, 40, the signal strengths forming the impulse response of the channel. The device 30 and the distribution device 50 determine the strength of a part of a signal delayed by a specific propagation delay by several values of the propagation delay. The distribution device 50 compares the delay differences of the received signals with each other. The distribution device 50 can be implemented by a microcircuit based on ASIC technology, for example. The functions of the distribution device 50 can at least partly be implemented by software.

The receiver further comprises a device 70 and a device 80. The device 70 controls the operation of the different parts of the receiver. In practice, the device 70 is a microprocessor, for example. Information necessary for the different functions of the receiver can be stored at the device 80. The device 80 is, in practice, a memory circuit wherefrom the device 70 retrieves information and wherein the device 70 can store information when necessary.

Figure 3:
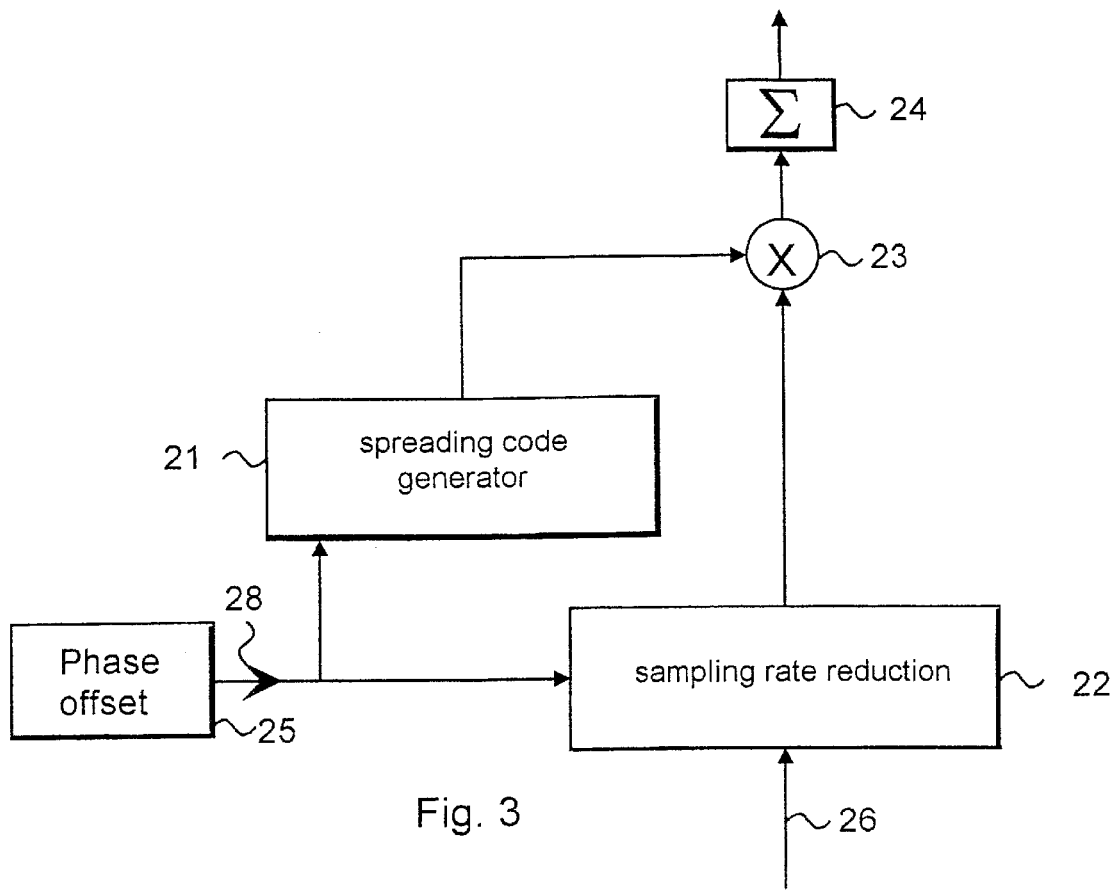
FIG. 3 shows a RAKE finger.

FIG. 3 shows in closer detail a RAKE finger wherein correlation for the signal is carried out and the spreading code is decoded. The RAKE finger comprises a spreading code generator 21, a device 22, a multiplication device 23 and a summing device 24. The receiver further comprises a device 25, which, on the basis of the code phase information received from the distribution device 50, either delays or advances the spreading code bit sequence generated by the spreading code generator 21. The spreading code generator 21 can generate a pseudo-random bit sequence similar to the spreading code used at the spreader 14 of the transmitter.

In the receiver of the invention, the code phases of the RAKE fingers can be selected by utilising the propagation delay profile of the channel, in the determination of which the matched filter of the spreading code can be used. The delay profile can also be determined in some other way than by the device 30. In practice, the device 30 is a matched filter. In order for the correlation procedures carried out by the receiver to be optimal, the delays of the spreading codes are adjusted at the receiver such that they correspond to the estimated propagation delays of the radio wave as accurately as possible. Selecting and adjusting the delays of the spreading codes are also called RAKE finger allocation.

For the code phase, a search is conducted for a propagation delay value which corresponds to a certain phase of the spreading code generator 21 by the distribution device 50. A signal 28 is generated on the basis of the delay value found by the distribution device 50, and the receiver advances or delays the spreading code bit sequence by this signal. In addition, the device 22 selects a correct sampling point on the basis of the information contained in the signal 28.

The device 22 receives a spreading-coded signal 26 received by the antenna. The device 22 can lower the sampling rate of the signal, whereby one sample can correspond to one chip, for example, i.e. a bit of a spreading code. In lowering the sampling rate, the device 22 can use decimation or interpolation, for example. The signal generated by the device 22 and the signal generated by the spreading code generator 21 are supplied to the multiplication device 23, at which the signals are multiplied by each other. Multiplying the signals removes the spreading code from the signal. As a result of the multiplications of the signals, the multiplication device 23 provides multiplication results which are summed at the summing device 24. Summing the multiplication results is carried out such that samples are added up from which the spreading code is decoded and which are associated with the same bit. The bits provided from the output of the summing device 24 are supplied to the combiner 60.

The delays of the RAKE fingers, i.e. the phases of the spreading code generators of the fingers, must not locate too close to each other. If the differences between the code phases are too small, the RAKE fingers receive partly the same multipath components, which are thus overemphasized at reception. The weighting of the kind mentioned above may lead to deterioration in the quality of the maximal-ratio-combined signal. In order to eliminate this problem, the receiver can use the following minimum distance condition:

$$|t_a - t_b| \geq d\_min.$$

Terms $t_a$ and $t_b$ in the minimum distance condition designate the relative delays (phase differences) of RAKE fingers a and b demodulating the same antenna signal. The delay value set for the RAKE finger and the phase of the spreading code generator corresponding to the delay value are called a RAKE finger allocation point. In other words, the above-mentioned condition means that different allocation points must have a difference of a magnitude of at least d_min.

In a radio system of a DS-CDMA type, for example, a suitable minimum distance d_min can depend on duration Tc of the symbol, i.e. chip, of one spread broadband signal in the following manner, for example:

$$d\_min=(\tfrac{3}{4})Tc$$

or $$d\_min=Tc.$$

In order to achieve sufficient performance, it must be possible in the DS-CDMA system to adjust the RAKE finger allocation points at an accuracy which corresponds to the length (¼)Tc of an adjustment step of the delay or an adjustment step smaller than this. The above-mentioned values (¾)Tc and Tc of the minimum distance d_min thus correspond to, for example, either three or four adjustment steps.

For the RAKE finger allocation, the propagation delay profile of the channel is estimated by determining the power density of the signal for possible values of the propagation delays. Each value of the propagation delay is restricted to a certain range of finite size due to, for example, the finite magnitude of the physical distance between the transmitter and the receiver. The variation range of the propagation delay can be covered, for example, such that the power density of the signal to be received is estimated for different delays at intervals of (¼)Tc, whereby the power densities measured for different propagation delays constitute the impulse response estimate of the channel.

In the method of the invention, the RAKE finger allocation points are selected in such a manner, for example, that the sum of the impulse response samples corresponding to the allocation points is maximized. In addition, the allocation points are required to meet the minimum distance condition.

Figure 4:
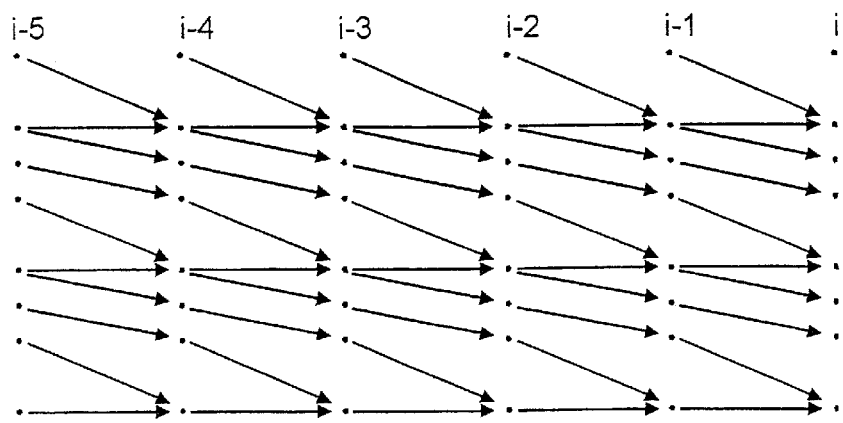
FIG. 4 shows a trellis diagram.

The selection of code phases for different RAKE fingers based on the impulse response estimate can be reduced to a problem wherein a search is conducted for an optimal route through the so-called directional network, i.e. trellis diagram. FIG. 4 shows a possible trellis diagram. The network of FIG. 4 comprises layers and transitions between the layers. The number of the layers is the same as the number of the impulse response estimates. Each layer of the network comprises a number of states, i.e. nodes. The trellis diagram according to FIG. 4 relates to a case wherein delay values are selected for one, two or three RAKE fingers when the required minimum distance of the allocation points is at least three sample intervals of the impulse response estimation. The method can, however, be easily modified to suit cases wherein the number of the RAKE fingers or the minimum distance of allocation points obtains another value.

Each sample S(i) of the impulse response estimate, where i=0, ... L−1, corresponds to one layer of the network. A weight value dependent on the impulse response estimate is attached to the transitions between the layers. A path travelling through the network, i.e. a route, is optimal if the sum of the weight values of the transitions of the path is higher than the sum of the weight values of the transitions of all other possible paths terminating at the same state of the network.

Figure 5:
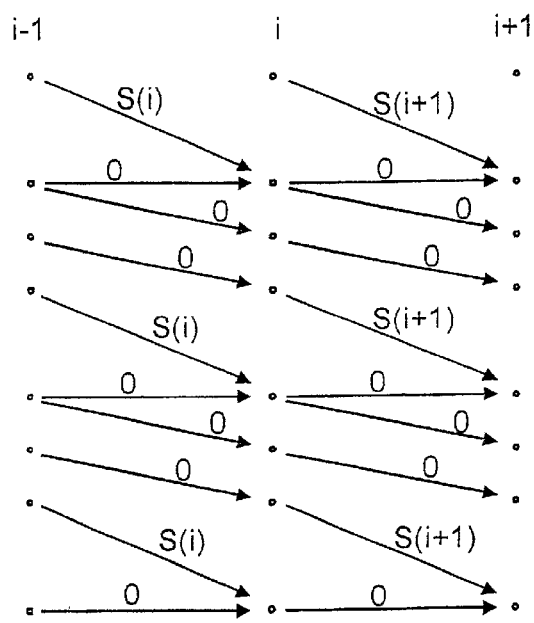
FIG. 5 shows a trellis diagram.

FIG. 5 shows a diagram wherein the transitions between different layers are provided with a weight value, whereby the optimality of the paths can be compared with each other. If the impulse response estimate comprises L samples: S(0), S(1), ..., S(L−1), optimal RAKE finger allocation points can be found on paths terminating at layer L−1 of the network.

Figure 6:
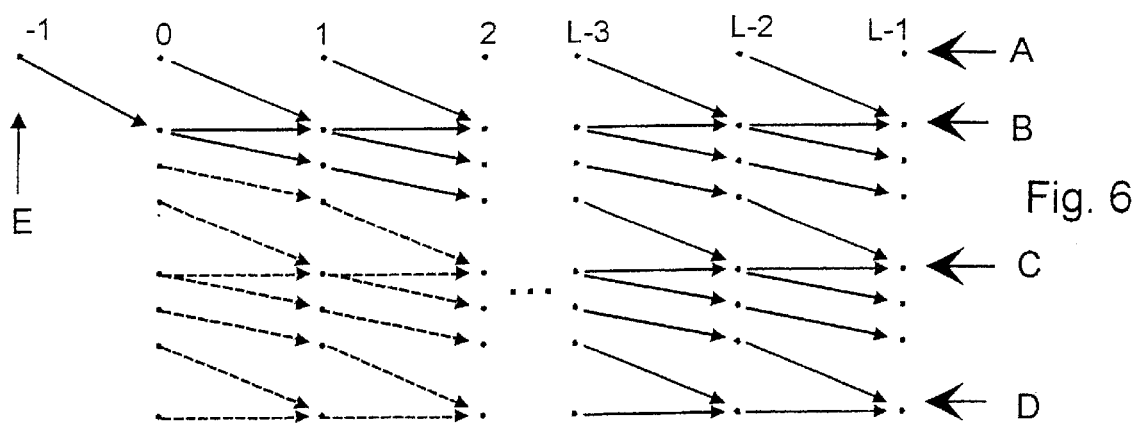
FIG. 6 shows a trellis diagram.

FIG. 6 shows a trellis diagram such that the first and the last layers of the diagram are included in the figure. The states at node point A of the diagram are so-called 'zero states'. Each allowed path that travels through the network starts from a zero state of the diagram. State E is the first zero state from which a path travelling through the network can in principle start. If only one allocation point is to be found for the RAKE receiver, the delay value can be found by following the optimal path which ends at node point B. If two allocation points are to be found, the delay values can be found by following the optimal path which ends at node point C. If three allocation points are to be found, the delay values can be found by following the path terminating at state D. In all cases, the weight of the optimal path is a sum of power density samples S(j) corresponding to allocation points j.

Hence, the problem concerning finger allocation is solved in such a manner that the length of the impulse response is increased gradually. By the method, a search is conducted for optimal positions for all numbers of the fingers that are smaller than a certain maximum number. This is carried out by increasing the examined propagation delay range little by little. In each step, the propagation delay range is increased by one sample value; for example. An optimum is searched for by utilising the optimum points found earlier for a smaller propagation delay range and for different numbers of the fingers.

For RAKE finger allocation, the search for values of the propagation delays is conducted in two steps. The intermediate steps of the search procedure resemble a so-called Viterbi algorithm used in decoding convolution codes, which is an application of a mathematical calculation technique called dynamic programming. In the first step, optimal routes are established through the trellis diagram shown in FIGS. 4, 5 and 6. In the second step, shown in FIG. 6, the optimal path terminating at layer L−1 of the network is followed back through the network, whereby the allocation points along the path are found.

Figure 7:
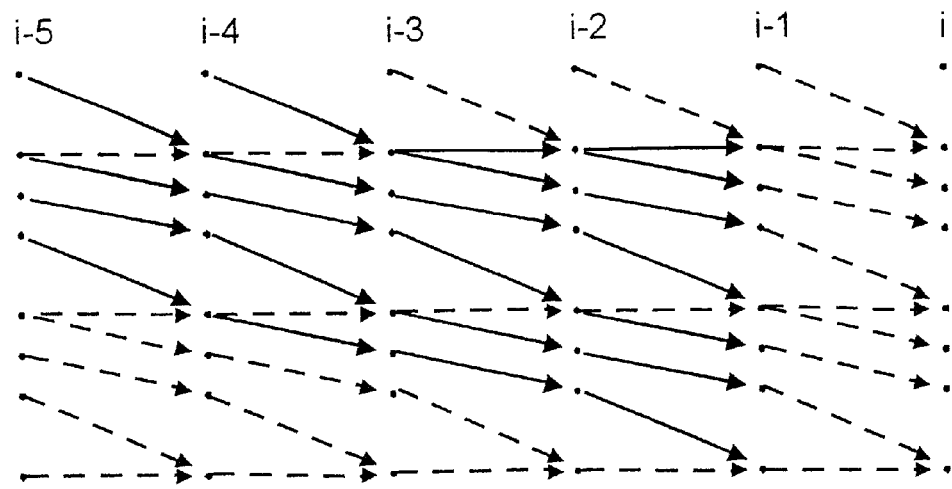
FIG. 7 shows a diagram specifying a search for optimal paths.
Figure 8:
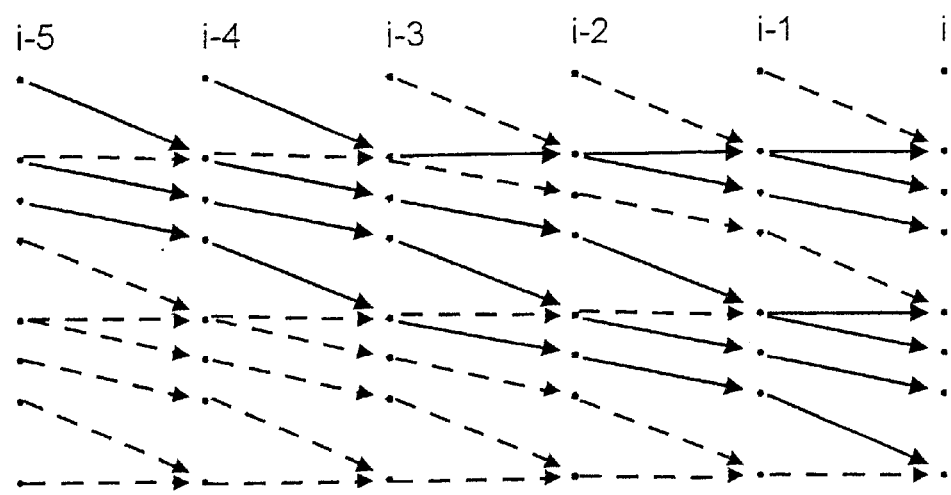
FIG. 8 shows a diagram specifying a search for optimal paths.

In the first step, the search for an optimal route proceeds layer by layer as shown in FIGS. 7 and 8. Exemplary optimal routes terminating at layer i−1, i.e. so-called survivor paths, are indicated in unbroken lines in FIG. 7. Optimal routes terminating at layer i can be established by continuing the paths terminating at layer i−1 such that transition weights corresponding to the transition between layers i−1 and i are added to the weight value of each path, the transition weights being determined, in accordance with FIG. 5, by means of the impulse response estimates S(i). If a transition from layer i−1 to state i of the layer is possible via more than one route, a route with the highest weight value is selected as the optimal route leading to state i. The selection decisions are stored in the memory, whereby they are available in the second step of the determination procedure of the RAKE finger allocation points. The selection of an optimal route from among two or more paths arriving at a state of the type described above in connection with the Viterbi algorithm is called an ACS (Add, Compare and Select) operation.

The second step of the procedure is explained by means of FIG. 6. In the second step, the optimal path terminating at the last layer L−1 of the diagram is followed back through the network. The allocation points j of the RAKE fingers are thus found on the basis of the information stored in the first step of the procedure. The power density samples S(j) corresponding to the allocation points j were added to the weight of the optimal path in the first step of the procedure. The delay values determined in this manner are optimal in that the sum of the power density samples S(j) of the impulse responses corresponding to the found allocation points j is the highest possible one which can be obtained when the allocation points of the RAKE fingers are at least the minimum distance apart. In the examples shown in FIGS. 4 to 8, the value of the minimum distance is three sample intervals of the impulse response.

Figure 9:
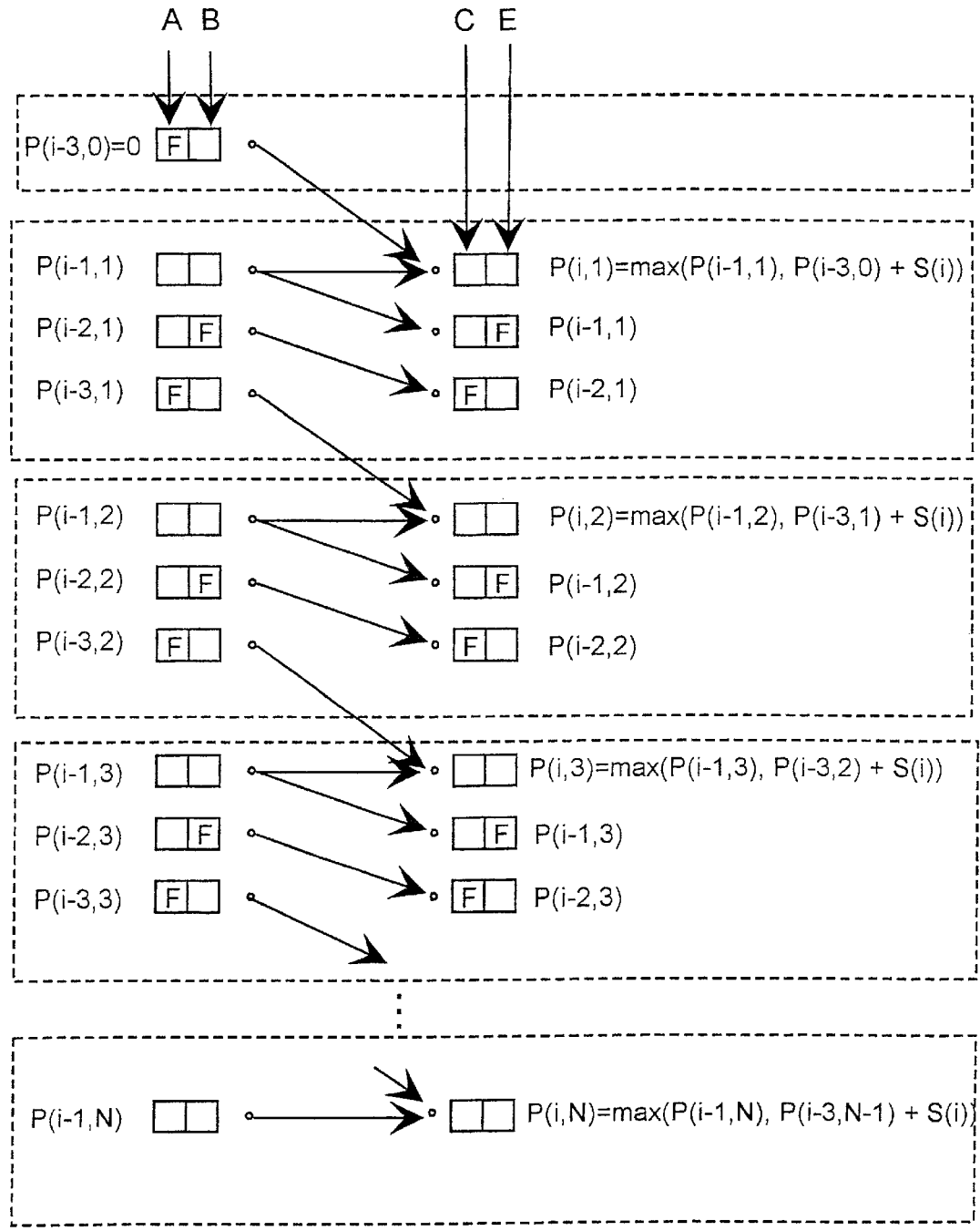
FIG. 9 shows a diagram displaying the positions of allocation points of RAKE fingers associated with the paths of the network.

FIG. 9 illustrates in closer detail the role of the states of the network of the kind shown in FIGS. 5 to 8 in determining the delay values of the RAKE fingers when the number of the allocation points to be found is N at most. In FIG. 9, sum P(i,f), where f depicts the number of the impulse response samples included in the sum, has been attached to each state of the network power, the power sum P(i,f) corresponding to a state. Said number of impulse response samples is the same as the number of allocation points on the path terminating at the state.

In the example shown in FIG. 9, the distance between the RAKE finger allocation points located on the path travelling through the network must not be shorter than three sample intervals. This condition can be met in such a manner that each layer of the network comprises a separate state for each possible so-called allocation pattern. The allocation pattern of the state indicates allocation decisions to be made immediately during the next transitions on the path travelling through the state. If the minimum distance is three sample intervals, the allocation pattern associated with each state of layer i indicates whether a delay value corresponding to impulse response sample S(i+1) or S(i+2) is added to become an allocation point on the path travelling through the state. Each transition between two states is associated with an allocation pattern of both the initial state and the final state of the transition. Together these allocation patterns indicate whether one of the three sequential delay values is selected as an allocation point located on the path travelling through the transition.

The minimum distance condition can now be ensured by determining the allowed states and transitions of the network such that at most one out of the three sequential delay values is allocated to one path travelling through the trellis diagram. FIG. 9 illustrates one such selection of states and transitions of a network. The minimum distance requirement of the RAKE finger allocation points can thus be guaranteed by selecting the structure of the network as shown by way of example in FIGS. 4 to 9.

In FIG. 9, the allocation patterns associated with the states of the network are shown by means of two adjacent squares. Symbol F in a square refers to the selection of a delay value as an allocation point on the paths travelling through the state. An empty square denotes that the delay value is not selected as an allocation point on the paths travelling through the state.

In FIG. 9, column A indicates the allocation decisions concerning delay value i corresponding to impulse response sample S(i) that are to be made on the paths travelling through the states belonging to layer i−1. Column B in FIG. 9 describes the allocation decisions concerning delay value i+1. Correspondingly, column C in layer i of the network depicts the allocation decisions associated with delay value i+1. Column E depicts the decisions associated with point i+2. In order to enable a transition between the states, the initial state of the transition in column B must comprise the same value as the final state of the transition in column C since these points correspond to an allocation decision to be made for the same delay i+1. In order for the minimum distance condition to be valid on all feasible paths, at most one out of the three columns A, B or E can comprise the delay value on the basis of which the allocation point is selected. A potential allocation point is denoted by the letter F in the figure.

It is obvious that trellis diagrams corresponding to FIGS. 4 to 9 can be formed for any number N of the delay values to be found and the minimum distance d_min of allocation points. After the diagrams have been formed, a search for an optimal route can be conducted to determine the delay values j with which the highest sum of corresponding impulse response estimates S(j) can be obtained when the selected delay values j must differ from each other at least a minimum distance d_min. Similarly, it is obvious that the method based on dynamic programming for finding the optimal route by utilising the trellis diagram is suited for use in a network of any form that comprises sequential layers.

An optimization criterion used in the method disclosed above is that the sum of the impulse response estimates calculated for the finger allocation points is the highest one that can be obtained without violating the minimum distance condition set for the allocation points. This optimization criterion is not, however, the only feasible one; other kinds of optimization criteria can provide a similar result.

An alternative is to select the allocation points by maximizing the sum of two different terms. The first term is the sum used above of the power density estimates corresponding to the finger allocation points. The second term can describe interaction of some kind between the allocation points. In practice, the interaction term can be, for example, such that it prevents the allocation points from becoming too closely located. The interaction term can be selected, for example, such that it can be used for subtracting from the sum of the power density estimates the portion of the signal power that becomes received several times by RAKE fingers located near each other. By selecting the interaction term appropriately, the threshold can be steplessly adjusted on the basis of which several RAKE fingers are positioned in a wide power maximum of the impulse response. In order to be able to determine the allocation points by the method described above based on searching for an optimal path, the interaction can generally depend both on allocation points located nearer each other than a certain limit D and the values of the impulse response estimates.

Figure 10:
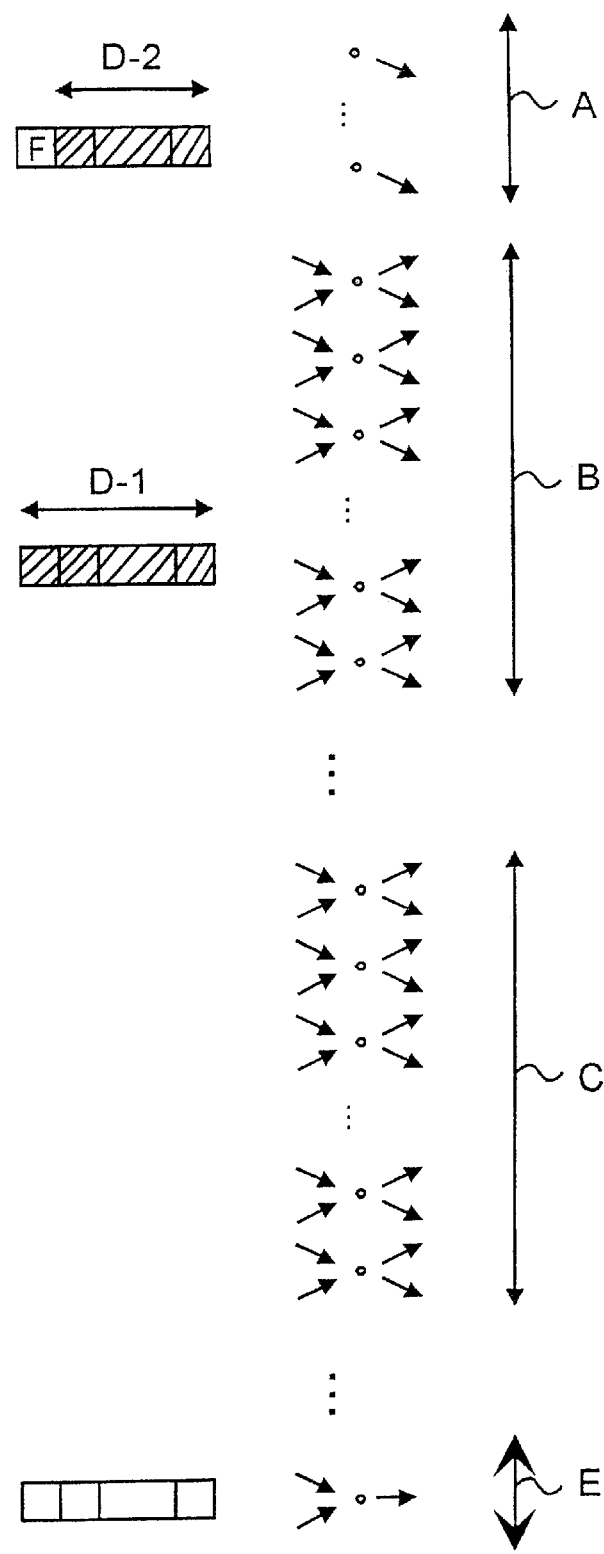
FIG. 10 shows a layer of the trellis diagram.

FIG. 10 shows a layer of a generalised trellis diagram. The layer relates to a situation wherein, in principle, all possible selections of allocation points are allowed without a minimum distance limit. The weights of the transitions between the layers can, however, be dependent on the allocation decisions concerning D sequential delay points. This means that an allocation pattern comprising an allocation decision at D−1 sequential allocation points is attached to the states. Hence, allocation decisions can be made at D sequential delay points on the allocation patterns of the initial state and the final state of a transition between the layers. Information about these allocation decisions can be used in calculating the weight values of the transitions between the states.

In FIG. 10, the number of the states which form a terminating point for paths with one selected allocation point is, in a general case, at most $2^{(D-1)}$ (state group B). This is due to the fact that each of the D−1 points of the allocation point can be empty or comprise a placing of an allocation point onto the path (symbol F). Similarly, the number of the states which form a terminating point for paths with a greater number of made allocation decisions is at most $2^{D-1}$ (state group C).

The number of the zero states of a layer (state group A) is at most $2^{D-2}$ since the first allocation point is selected in connection with each transition starting from a zero state. Consequently, in FIG. 10 in the square on the left side of the allocation patterns of state group A, the letter F has been plotted to denote an allocation selection. The contents of the other D−2 points of the allocation pattern are not fixed, in which case there are at most $2^{(D-2)}$ potential allocation patterns of the zero states.

If N is the highest number of RAKE fingers to be examined, each layer of the network comprises only one such state the paths leading to which comprise N allocation points. This is due to the fact that in this case there is only one allowed allocation pattern since no new allocation decisions are made on the path leaving the state. Consequently, in the above-mentioned case, the only allowed allocation pattern corresponds to a sequence of empty squares as shown at the lower edge of FIG. 10.

Figure 11:
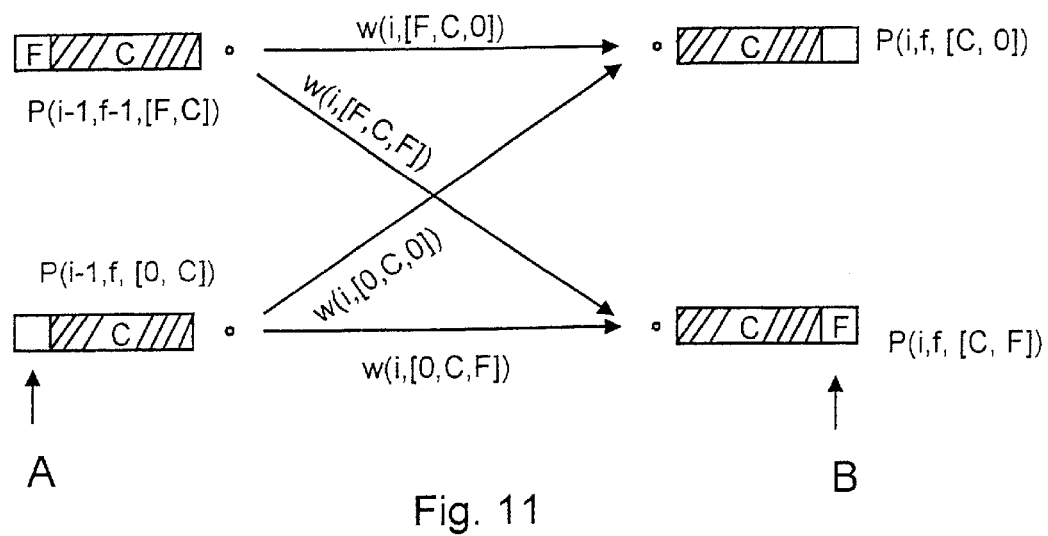
FIG. 11 shows transitions between the layers of the network.

FIG. 11 illustrates the structure of the transitions between two sequential layers of a trellis diagram. The trellis diagrams shown in FIG. 11 are similar to those shown in FIG. 10. The allocation patterns associated with the states are shown in FIG. 11 in such a manner that symbol C denotes a part of an allocation pattern comprising D−2 sequential allocation decisions. In FIG. 11, symbol C comprises allocation decisions associated with delay values i+1, i+2, ..., i+D−2. The allocation patterns are presented by adding, before or after symbol C of the allocation pattern, either an F to denote the allocation point or a zero to indicate that allocation is not carried out for the delay value in question. The F or the zero located before symbol C corresponds to delay value i, and the F or the zero located after symbol C corresponds to delay value i+D−1. The allocation patterns of the states located on the right side in FIG. 11 are thus presented by symbols [C, 0] and [C, F]. The sums of the weight values of the transitions calculated for the states are updated by values obtained from the following formulas:

$$P(i,f,[C,0]) = \max\ (P(i-1,f-1,[F,C]) + w(i,[F,C,0]),\ P(i-1,f,[0,C]) + w(i,[0,C,0]))$$

$$P(i,f,[C,F]) = \max\ (P(i-1,f-1,[F,C]) + w(i,[F,C,F]),\ P(i-1,f,[0,C]) + w(i,[0,C,F]))$$

Herein, symbol P(i,f,[ ... ]) refers to the sum of the transition weights of an optimal path arriving at a state, f means the number of the allocations located on the optimal path arriving at the state, and symbols [C, 0], [C, F], [0, C] and [F, C] refer to the allocation patterns of the states, as stated above. Symbol w(i,[ ... ]) means that for calculating the transition weight, it is possible to use both information about layer index i and information about the allocation decisions associated with D sequential points i, ..., i+D−1 presented by symbols [F,C,0], [0,C,0], [F,C,F] and [0,C,F] in the formulas and FIG. 11. In typical applications, transition weights w(i,[0,C,0]) and w(i,[0,C,F]) corresponding to symbols [0,C,0] and [0,C,F] obtain a value zero since the point corresponding to delay i designated by these symbols is not selected as the allocation point.

The receiver thus forms sums of the strengths of the signal parts determined by values of a different propagation delay. The distribution device 50 located at the receiver selects from among the received signals those signals whose delay values deviate by at least a predetermined delay difference and whose sum of the strengths of the signal parts obtains the highest possible value. Next, the receiver indicates the received information by using the signals selected above. In the selection of the delay values, the receiver utilises a trellis diagram with the states and transitions therein being weighted. The weight coefficients used in weighting depend on the strengths of the signals received at different propagation delays.

The distribution device 50 determines the number of the delay values and the delay values such that the distribution device 50 first determines propagation delays for each number of the propagation delay values. The receiver selects the delay values from a route with the highest sum of weight values. Next, the distribution device 50 selects the delay values corresponding to one number of the propagation delay values in order to indicate the information. The information can be indicated by using prior art methods. As the optimal number of the delay values, the distribution device selects the number whereby the increase of the weight coefficient sum ends although the number of the delay values increases. The distribution device determines the delay values to be used in indicating the information from a route which corresponds to the optimal number of the delay values.

The receiver determines the impulse response of the channel in such a manner, for example, that the receiver calculates the correlation between the known bit pattern or chip pattern and the signal received by the receiver. Calculating the correlation is carried out by different delays. In the CDMA, the chip pattern is determined on the basis of a spreading code.

In a TDMA system, on the other hand, a training sequence is utilised in measuring the channel. The reception method of the invention can be used in the TDMA system in such a manner, for example, that delay values are selected from the power distribution of the impulse response by the method. A mean value of a longer period, for example, can be used as the power distribution. A criterion to be used in the TDMA system may be that the distance between the selected delay values is at least as long as a bit period. Complex impulse response is calculated by estimating the amplitude offset and the phase offset caused by the channel for the selected delay values. The complex impulse response can be used in equalizers of the GSM systems which reduce the effects caused by a multipath channel on the received bits.

A trellis diagram illustrated by FIGS. 10 and 11 can be understood to be a generalised form of the trellis diagrams shown in FIGS. 5 to 9. The general trellis diagram in FIGS. 10 and 11 can easily be simplified to yield, for example, the trellis diagrams shown in FIGS. 5 to 9. Distance D found in FIGS. 10 and 11 can be given a value three, for example, which enables the minimum distance of the allocation points to be described as shown in FIG. 7, the minimum distance being three sample intervals.

Next, the states and transitions between the states which disagree with the minimum distance condition can be removed from the trellis diagram. Similarly, the value of the transition weight w(i,[ ... ]) can be selected for the remaining allowed transitions, for example as shown in FIG. 5. Using such a procedure results in immediate transition from the diagrams of FIGS. 10 and 11 to the networks and determination methods of the allocation points corresponding to the networks shown by FIGS. 5 to 9. In a similar manner, a selection method of the RAKE finger delays can also be created for those cases in which the minimum distance has another value, or when there exists some other interaction between the RAKE finger allocation points which extends to distance D and is to be taken into account in selecting the allocation points.

Searching for the optimal delay values, calculating the weight values of transitions in the trellis diagram, searching for an optimal route that travels through the trellis diagram, and determining an optimal number of the RAKE fingers can be implemented by software, for example, in which case the program implementing the method is located in the memory circuit 80 at the receiver. The inventive functions of the receiver can, however, also be implemented as non-software by means of, for example, a microcircuit based on ASIC technology and designed for the purpose.

Although the invention has been described above with reference to the example of the accompanying drawings, it is obvious that the invention is not restricted thereto but can be modified in many ways within the scope of the inventive idea disclosed in the claims.

What is claimed is:

1. A reception method wherein signals supplied from a radio path are received, and each signal which arrives at a receiver is delayed by a unique delay value, the method comprising:

determining a strength of a part of a signal delayed by a certain propagation delay for several values of the propagation delay, forming sums of the strengths of signal parts determined for different propagation delay values, selecting from among the received signals those signals whose propagation delay values deviate at least by a predetermined delay difference and whose sum of the strengths of the signal parts obtains the highest possible value, and indicating information using the signal parts which correspond to the selected signals.

2. A reception method wherein signals supplied from a radio path are received, and each signal which arrives at a receiver is delayed by a unique delay value, the method comprising:

determining a strength of a part of a signal delayed by a certain propagation delay for several values of the propagation delay, utilising a trellis diagram including transitions weighted by coefficients dependent on the strengths of parts of a signal, searching for optimal routes through the trellis diagram based on sums of the weight values of the transitions, selecting propagation delay values by utilising found optimal routes, and indicating the signals received from the radio path based on the parts of the signals corresponding to the selected propagation delay values.

3. The method of claim 1, wherein selecting from among the received signals is performed utilising a trellis diagram including a number of states and transitions between the states.

4. The method of claim 1, wherein selecting from among the received signals is performed utilising a trellis diagram comprising a number of states and transitions between the states, which are given weight coefficients dependent on the strengths of the signals received at different propagation delays.

5. The method of claim 1, wherein selecting from among the received signals is performed utilising a trellis diagram comprising a number of states and transitions between the states, which form routes and to which weight coefficients are given, and selecting the delay values from a route with the highest sum of weight values.

6. The method of claim 1, further comprising determining the number of the delay values and the delay values such that propagation delays are first determined for each number of the propagation delay values, whereafter the delay values which correspond to one number of the propagation delay values are selecting for indicating the information.

7. The method of claim 2, further comprising using the signal strengths determined for the propagation delay values as weight values of the transitions of the trellis diagram.

8. The method of claim 1, further comprising determining optimal routes by means of a Viterbi algorithm.

9. The method of claim 2, wherein the optimal routes are determined from the trellis diagram such that the optimal routes are first determined to layer i of the trellis diagram, whereafter the optimal routes are determined to the next layer i+1 by utilising the routes determined to the previous layer i.

10. The method of claim 9, wherein the optimal routes are determined until all optimal routes are found in the diagram.

11. The method of claim 9, further comprising following the optimal routes, selecting the most optimal route, and selecting propagation delay values which deviate from each other at least by a predetermined delay difference to be the delay values to correspond to the most optimal route.

12. The method of claim 9, further comprising following the optimal routes, selecting as the most optimal route the route with the highest weight coefficient sum, and selecting propagation delay values which deviate from each other at least by a predetermined value to be the delay values to correspond to the most optimal route.

13. The method of claim 2, further comprising determining the optimal routes corresponding to the numbers of different delay values through the trellis diagram, and selecting the optimal number of the propagation delay values based on the weight coefficient sums of the found optimal routes.

14. The method of claim 2, further comprising determining the optimal routes corresponding to the numbers of different delay values through the trellis diagram, selecting the optimal number of the propagation delay values based on the weight coefficient sums of the found optimal routes, and selecting as the optimal number of the propagation delay values, the number whereby an increase of the weight coefficient sum ends even though the number of the propagation delay values is increased.

15. The method of claim 2, further comprising determining the optimal routes corresponding to the numbers of different delay values through the trellis diagram, selecting the optimal number of the propagation delay values based on the weight coefficient sums of the optimal routes, and selecting as the optimal number of the propagation delay values, the number whereby an increase of the weight coefficient sum ends even through the number of the propagation delay values is increased, and determining the propagation delay values to be used in indicating the information from the route that corresponds to the optimal number of the propagation delay values.

16. A receiver to receive signals supplied from a radio path, the signals including information and each signal arriving at the receiver delayed by a unique delay value, the receiver comprising:

a filtering device and a distribution device to determine the strength of a part of a signal delayed by a certain propagation delay by several values of the propagation delay, wherein the distribution device compares the delay differences of the received signals with each other and forms sums of the strengths of signal parts determined by different values of the propagation delay, the distribution service selects from among the received signals those signals whose propagation delay values deviate at least by a predetermined delay difference and whose sum of the strengths of the signal parts obtains the highest possible value, and the receiver indicates the received information by using the signals selected above.

17. The receiver of claim 16, wherein the receiver selects from among the received signals by utilising a trellis diagram including a number of states and transitions between the states.

18. The receiver of claim 16, wherein the distribution device selects the propagation delay values by utilising a trellis diagram including a number of states and transitions between the states, to which the receiver gives weight coefficients dependent on the strengths of the signals received at different propagation delays.

19. The receiver of claim 16, wherein the propagation delay values are selected by the distribution device by utilising a trellis diagram including a number of states and transitions between the states, which form routes and to which the receiver gives weight coefficients, and wherein the receiver selects the propagation delay values from a route with the highest sum of weight values.

20. The receiver of claim 16, wherein the distribution device determines the number of the propagation delay values and the propagation delay values such that the distribution devices first determines the propagation delays for each number of the propagation delay values, whereafter the distribution device selects the propagation delay values which correspond to one number of the propagation delay values for indicating the information.

21. The receiver of claim 16, wherein the distribution service determines the number of the propagation delay values and selects as the optimal number of the propagation delay values the number whereby an increase of a weight coefficient sum ends even though the number of the propagation delay value is increased.

22. The receiver of claim 16, wherein the receiver determines the propagation delay values to be used in indicating the information from a route which corresponds to the optimal number of the delay values.

23. The receiver of claim 2, wherein the optimal routes are determined by means of a Viterbi algorithm.

* * * * *